United States Patent [19]

Ostrem

[11] 4,102,377

[45] Jul. 25, 1978

[54] STEERING WHEEL COVER DEVICE

[76] Inventor: Nels M. Ostrem, 128 Mirabeau Ave., San Pedro, Calif. 90732

[21] Appl. No.: 840,125

[22] Filed: Oct. 7, 1977

[51] Int. Cl.² .............................................. B62D 1/06
[52] U.S. Cl. ................................................. 150/52 M
[58] Field of Search .............. 150/52 M, 54 B; 74/558

[56] References Cited

U.S. PATENT DOCUMENTS 2,601,881  7/1952  Oberlin ............................ 150/52 M

FOREIGN PATENT DOCUMENTS 27,322 of  1904  United Kingdom ................... 74/558

Primary Examiner—Donald F. Norton
Attorney, Agent, or Firm—Fulwider, Patton, Reiber, Lee & Utecht

[57] ABSTRACT

A steering wheel cover device for maintaining a steering wheel cool in hot climates. The cover includes a cover sheet which overlies the rear of the top section of the steering wheel and the entire upwardly facing area of the steering wheel. A layer of open cell synthetic plastic foam is secured to the interior surface of the cover sheet to abut the steering wheel.

3 Claims, 4 Drawing Figures

U.S. Patent      July 25, 1978      4,102,377
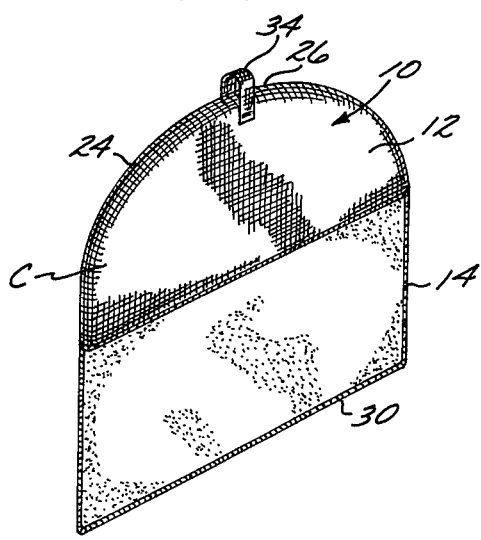
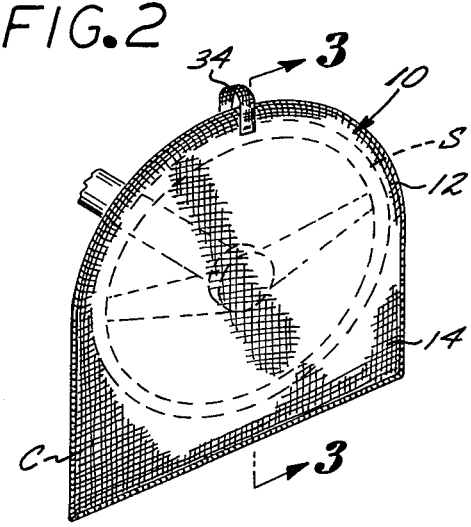
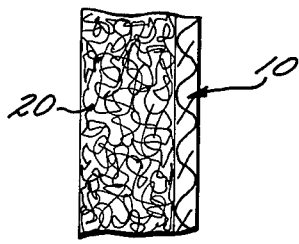
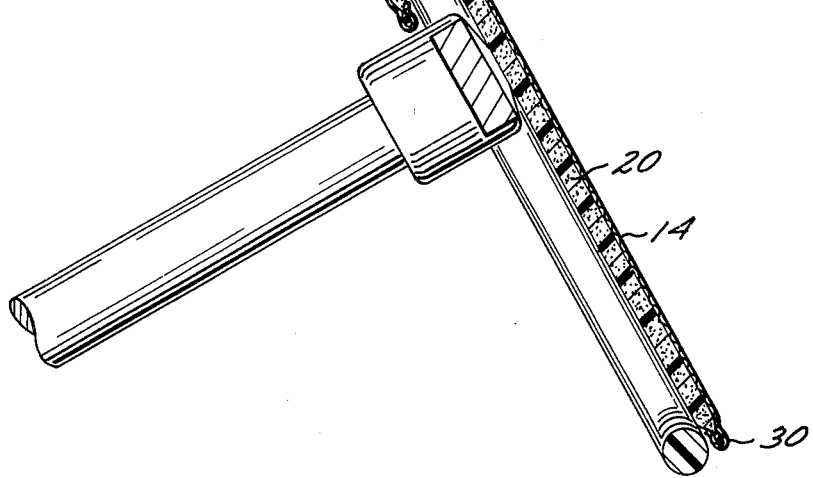

STEERING WHEEL COVER DEVICE

BACKGROUND OF THE INVENTION

An automobile steering wheel exposed to the sun quickly becomes very hot to the touch. Accordingly, a driver must wait until the steering wheel cools to a comfortable temperature or, alternatively, wear driving gloves. Various steering wheel covers which remain constantly affixed to the steering wheel have heretofore been proposed. Such steering wheel covers, however, are generally bulky and/or do not remain firmly attached to the steering wheel thereby causing driving difficulties.

SUMMARY OF THE INVENTION

It is a major object of the present invention to provide a steering wheel cover device which will prevent a steering wheel from becoming uncomfortably hot when exposed to the sun.

Another object of the present invention is to provide a steering wheel cover device of the aforedescribed nature which is easily applied to and removed from a steering wheel and which is independent of such steering wheel.

Yet another object of the present invention is to provide a steering wheel cover device of the aforedescribed nature which is economical of manufacture.

An additional object of the present invention is to provide a steering wheel cover device of the aforedescribed nature which may be easily stored when not engaged with the steering wheel.

Other objects and advantages of the present invention will become apparent from the following detailed description taken in conjunction with the appended drawings.

BRIEF DESCRIPTION OF THE DRAWINGS

FIG. 1 is a perspective view of a preferred form of steering wheel cover device embodying the present invention;

FIG. 2 is a perspective view of said steering wheel cover device as applied to a steering wheel;

FIG. 3 is a vertical sectional view taken in enlarged scale along line 3—3 of FIG. 2; and FIG. 4 is a further enlarged view of the encircled area designated 4 in FIG. 3.

DESCRIPTION OF THE PREFERRED EMBODIMENT

Referring to the drawings, there is shown in FIG. 1 a steering wheel cover device C embodying the present invention. Such steering wheel cover device C is adapted to be applied to a steering wheel S shown in FIGS. 2 and 3 to protect such steering wheel against the heating effects of the sun. Such steering wheel cover device C includes a cover sheet generally designated 10 having an arcuate upper pocket section 12 from which depends a generally rectangular frontal skirt 14 that overlies the lower half of the steering wheel S. The arcuate pocket section 12 defines a cavity 18 which receives the upper half of the steering wheel S. The inner surface of the cover sheet C is lined with a layer of synthetic plastic heat insulating foam 20 that engages steering wheel S.

More particularly, the cover sheet C is formed of a scorch-resistant synthetic plastic, heat ray-reflecting material such as Teflon, a product of E. I. duPont de Nemours & Co., Wilmington, Delaware. Such material is commonly employed in the manufacture of ironing board covers, bar-b-que mitts and the like. It can generally withstand a temperature of 450° F. for a minimum of twelve minutes before scorching. Preferably, cover sheet S is formed of a single piece of material which is folded over at its upper midportion 22 and seamed along its outer upper edges as indicated as 24 and 26 (FIG. 1).

The foam material 20 is preferably of the open cell type. A suitable material is marketed by Wilshire Foam Products, Inc., Carson, California, under the name PVC-Coated Scott Industrial Foam. Preferably, the foam 20 is of integral construction having its upper portion bent over under the upper central portion of the cover C as shown at 28 (FIG. 3), and is seamed to the periphery of the cover sheet by suitable peripheral stitching, as indicated at 30.

The upper portion of the cover sheet 10 is provided with a loop 34 which serves as a means for lifting the steering wheel cover from the steering wheel when such cover is at an elevated temperature.

In the use of the aforedescribed steering wheel cover device C, such device may be readily stored in a comparatively small space until such time as it is to be used. When the automobile is to be parked in the sun, the steering wheel cover device C is merely slipped over the upper half of the steering wheel S, the upper half of such steering wheel being received within cavity 18 of the cover. Thereafter, the steering wheel cover device C will prevent the temperature of the steering wheel S from becoming uncomfortably hot to the touch. This is achieved by the thermal insulating effect of the foam 20, together with the heat ray reflecting ability of the cover sheet 10. When the automobile is to be driven, the steering wheel cover device C may be readily lifted upwardly from the steering wheel S by means of the lifting loop 34. The provision of such lifting loop 34 eliminates the necessity of the driver handling the hot steering wheel cover device C. It will be apparent that the aforedescribed steering wheel cover device may be manufactured economically by unskilled labor using no special tools.

It will be noted that the steering wheel cover device will hang from the steering wheel S in a balanced manner thereby eliminating the necessity of any tying means such as strings or straps.

It will also be apparent that various modifications and changes may be made with respect to the foregoing detailed description without departing from the spirit of the present invention.

I claim:

1. A steering wheel cover device, comprising:
   a cover sheet of scorch-resistant material formed with an arcuate upper pocket section which receives the upper half of the steering wheel, and a frontal skirt depending from the front of said pocket section to overlie the lower section of the steering wheel; and
   a layer of synthetic plastic heat insulating foam secured to the inner surface of said cover sheet that engages the steering wheel.

2. A steering wheel cover device as set forth in Claim 1 wherein:
   said cover sheet is heat ray-reflecting and said foam is of the open cell type.

3. A steering wheel cover device as set forth in Claim 1 wherein:
   said cover sheet is provided with a lifting loop.

* * * * *